(12) United States Patent
Matsushita

(10) Patent No.: US 9,169,397 B2
(45) Date of Patent: Oct. 27, 2015

(54) MANUFACTURING METHOD FOR RESIN COMPOSITION CONTAINING FINE PAPER POWDER

(75) Inventor: Takamichi Matsushita, Tokyo (JP)

(73) Assignee: Kankyokeieisogokenkyusho Co., Inc., Tokyo (JP)

(*) Notice: Subject to any disclaimer, the term of this patent is extended or adjusted under 35 U.S.C. 154(b) by 103 days.

(21) Appl. No.: 13/363,216

(22) Filed: Jan. 31, 2012

(65) Prior Publication Data

US 2012/0329918 A1 Dec. 27, 2012

Related U.S. Application Data

(60) Provisional application No. 61/499,736, filed on Jun. 22, 2011.

(51) Int. Cl.

| | |
|---|---|
| C08G 79/02 | (2006.01) |
| B29B 7/00 | (2006.01) |
| C08L 101/00 | (2006.01) |
| B29C 47/40 | (2006.01) |
| B29C 47/10 | (2006.01) |
| B29C 47/60 | (2006.01) |
| B29C 47/76 | (2006.01) |
| B29C 47/88 | (2006.01) |
| C08L 1/02 | (2006.01) |
| C08L 97/02 | (2006.01) |
| B29C 47/00 | (2006.01) |

(52) U.S. Cl.
CPC ........... *C08L 101/00* (2013.01); *B29C 47/0021* (2013.01); *B29C 47/1045* (2013.01); *B29C 47/1081* (2013.01); *B29C 47/402* (2013.01); *B29C 47/6031* (2013.01); *B29C 47/6056* (2013.01); *B29C 47/767* (2013.01); *B29C 47/8845* (2013.01); *C08L 1/02* (2013.01); *C08L 97/02* (2013.01); *C08L 2205/18* (2013.01)

(58) Field of Classification Search
USPC .......................................................... 524/34
See application file for complete search history.

(56) References Cited

U.S. PATENT DOCUMENTS

| | | | | |
|---|---|---|---|---|
| 6,062,719 | A | * | 5/2000 | Busby et al. .................... 366/85 |
| 6,231,788 | B1 | * | 5/2001 | Patel ............................. 252/511 |
| 6,419,864 | B1 | * | 7/2002 | Scheuring et al. ............ 264/102 |
| 2012/0190775 | A1 | * | 7/2012 | Yasuda et al. .................... 524/9 |

FOREIGN PATENT DOCUMENTS

| | | | |
|---|---|---|---|
| JP | 02-034307 | 2/1990 | |
| JP | 09-169028 | 6/1997 | |
| JP | 10-138241 | 5/1998 | |
| JP | 11-034143 | 2/1999 | |
| JP | 2001-181511 | 7/2001 | |
| JP | 2001181511 A * | 7/2001 | ............. C08L 97/00 |
| JP | 2001-354795 | 12/2001 | |
| JP | 2002-047403 | 2/2002 | |
| JP | 2005-200593 | 7/2005 | |
| JP | 2006-117768 | 5/2006 | |
| JP | 2010-001440 | 1/2010 | |
| KP | 10-0346595 | 11/2002 | |
| WO | 2009/048472 | 4/2009 | |

OTHER PUBLICATIONS

Translation of JP 2001-181511, Jul. 3, 2001.*

* cited by examiner

*Primary Examiner* — Hui Chin
(74) *Attorney, Agent, or Firm* — Paul A. Guss

(57) ABSTRACT

A resin composition containing fine paper powder used in molding is obtained by using a fully-intermeshing type co-rotating twin-screw kneading extruder (10) having two material feeding ports (15 and 16) to knead a raw material containing a fine paper powder having an average particle diameter of 10 to 100 μm from 20 to 70 parts by weight and a thermoplastic resin from 30 to 80 parts by weight, a sum of the fine paper powder and the thermoplastic resin being 100 parts by weight, by feeding the thermoplastic resin through a main material feeding port (15) and the fine paper powder through a sub material feeding port (16).

15 Claims, 2 Drawing Sheets

MANUFACTURING METHOD FOR RESIN COMPOSITION CONTAINING FINE PAPER POWDER

BACKGROUND OF THE INVENTION

1. Field of the Invention

The present invention relates to a manufacturing method for manufacturing a resin composition containing fine paper powder in which fine paper powder is evenly dispersed and contained in resin.

2. Description of the Related Art

Nowadays, large amounts of waste paper are discarded from offices, publication houses, paper manufacturing companies and the like. In general, at a stage during manufacturing of paper from wood or the like, paper is subjected to a high degree of processing in order to render cellulose fibers finely softened, such that paper is a functional material having a value-added structure. Therefore, waste paper is originally a functional material having a value-added structure. Moreover, waste paper is a material that is effectively zero in terms of its environmental impact. Consequently, proposals have been made for using resin compositions containing paper, in which pulverized waste paper is mixed, for molding process materials.

For example, in Japanese Patent Laid-open No. 10-138241, there has been disclosed a resin pellet containing paper in which a composite paper having a polyethylene resin layer on at least one surface thereof is shredded into shredded paper components of about 1 mm to 5 mm square, and the shredded paper components are mixed at 50% by weight or greater with a synthetic resin component of polyethylene or the like to yield the resin pellet containing paper.

In Japanese Patent Laid-open No. 2001-181511, there has been disclosed a resin composition containing paper for use in molding processes, which contains in excess of 50% by weight and at or below 70% by weight of a low combustion heat component in powder form consisting mainly of paper powder and having a particle diameter of 50 µm or greater and 200 µm or less made by grinding waste paper or the like, and 30% or more by weight and less than 50% by weight of a high combustion heat component made up mainly from a thermoplastic resin.

However, paper having no fluidity disrupts the smooth flow of molten resins. Therefore, whether the resin pellet containing paper disclosed in Japanese Patent Laid-open No. 10-138241 or the resin composition containing paper for use in molding processes disclosed in Japanese Patent Laid-open No. 2001-181511 is used to produce a complex molded article by injection molding, defects such as filling failures occur easily, and transferability is also deteriorated, which makes it impossible to obtain molded products of a high quality.

SUMMARY OF THE INVENTION

The present invention has been accomplished in view of the aforementioned problems, and it is therefore an object of the present invention to provide a manufacturing method for a resin composition containing fine paper powder capable of obtaining the resin composition containing fine paper powder as a good molding process material which exhibits a good fluidity.

The manufacturing method of the present invention manufactures a resin composition containing fine paper powder used in molding by using a fully-intermeshing type co-rotating twin-screw kneading extruder having a plurality of material feeding ports to knead a raw material containing a fine paper powder having an average particle diameter of 10 to 100 µm from 20 to 70 parts by weight, a thermoplastic resin from 30 to 80 parts by weight, with a sum of the fine paper powder and the thermoplastic resin being 100 parts by weight, at a temperature of no more than 210° C. by feeding the thermoplastic resin through an upstream material feeding port and the fine paper powder through a downstream material feeding port.

According to the manufacturing method of the resin composition containing fine paper powder of the present invention, the obtained resin composition containing fine paper powder contains fine paper powder of extremely small average particle diameter of 10 to 100 µm, it is possible for it to be a good material having excellent transferability in molding. However, since the paper powder and the resin are not compatible, if all of the raw material is fed at one time through the main material feeding port at the upstream side, as in the conventional technique, even though the resin is molten, the fine paper powder which has no fluidity aggregates during the kneading, and in turn is mixed unevenly with the resin.

However, in the present invention, the fine paper powder is fed through the downstream material feeding port after the thermoplastic resin fed through the upstream material feeding port is molten; therefore, it is easy to disperse the fine paper powder in the molten resin evenly.

Moreover, if the fine paper powder and the resin are fed through the main material feeding port disposed at the upstream side of the kneading extruder, the mixture is subjected to a high temperature. The mixture is retained in the kneading extruder at high temperature for a long time, so that the paper components undergo a thermal degradation, which causes a yellow discoloration or a burnt smell occurred in the obtained resin composition containing fine paper powder.

Thus, in the present invention, the retention time of the fine paper powder in the kneading extruder is shortened by feeding the resin through the upstream material feeding port and the fine paper powder through the downstream material feeding port. Thereby, it is possible to prevent the fine paper powder from being retained in the kneading extruder at high temperature for a long time. In addition, the molten thermoplastic resin is cooled down by the fine paper powder fed through the downstream material feeding port at the room temperature and the temperature drops down, which makes it easy to perform the kneading at a temperature of no more than 210° C. As a result thereof, the thermal degradation of the paper components is inhibited, preventing a yellow discoloration or a burnt smell from occurring in the obtained resin composition containing fine paper powder.

Since the raw material is fed through a plurality of material feeding ports, it is possible to increase the feeding amount of the raw material per unit time, thereby, to improve the production efficiency.

According to the present invention, the fully-intermeshing type co-rotating twin-screw kneading extruder is provided with two screws, at least a part of each screw is provided with a kneading disc unit, the kneading disc unit disposed in one screw has a cross section which is orthogonal to the central axis of the screw and has the minor axis and the major axis orthogonal to each other and has the same cross section as the kneading disc unit disposed in the other screw, the two screws are disposed in such a way that the major axis of the kneading disc unit disposed in one screw enters into a rotation area surrounding the major axis of the kneading disc unit disposed in the other screw, and the two screws are configured to rotate at the same speed in the same direction with the major axis of the kneading disc unit disposed in one screw orthogonal to the major axis of the kneading disc unit disposed in the other screw.

In the manufacturing method of the resin composition containing fine paper powder of the present invention, it is preferable that the thermoplastic resin is polyolefin resin, polystyrene resin, or polylactic resin. In addition, it is preferable that the polyolefin resin is polyethylene, polypropylene, or a mixture thereof.

In the manufacturing method of the resin composition containing fine paper powder of the present invention, it is preferable that the raw material contains a compound having a maleic anhydride group from 0.3 to 5 parts by weight. Thereby, it is possible to improve the physical properties of the obtained resin composition containing fine paper powder.

The resin composition containing fine paper powder of the present invention can be used as an ideal material for molding a molded article by injection molding, extrusion molding or the like.

DETAILED DESCRIPTION OF THE PREFERRED EMBODIMENTS

Figure 1:
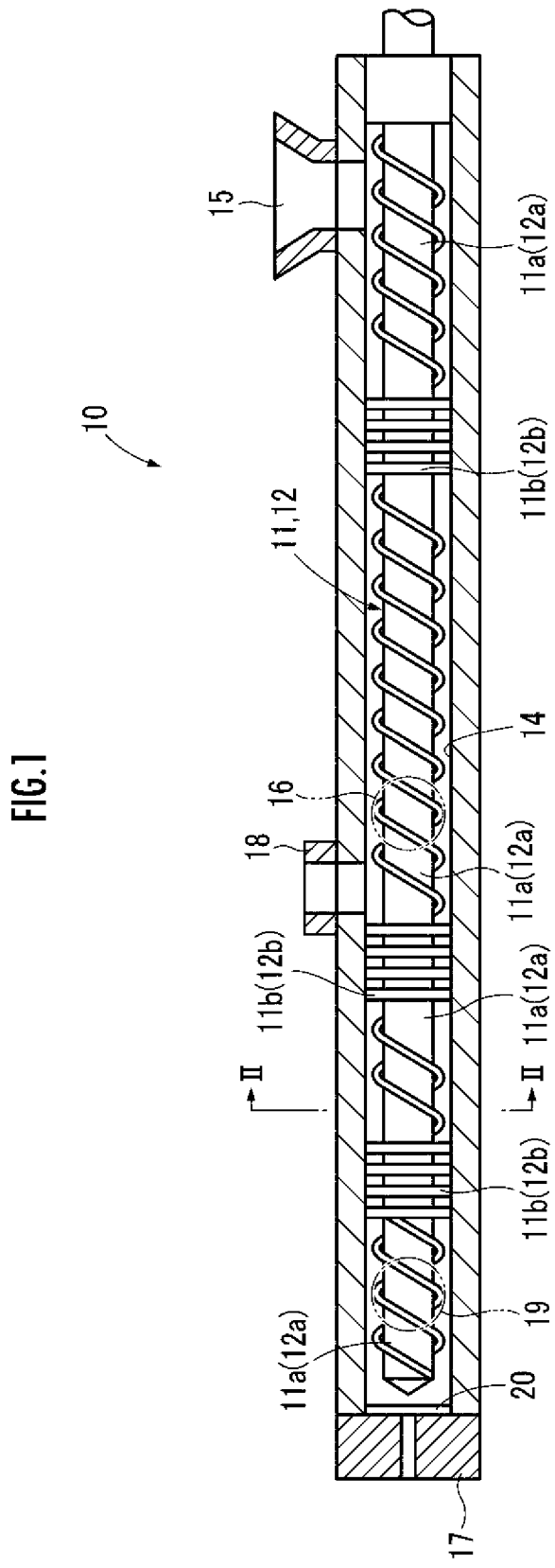
FIG. 1 is a schematic view illustrating a fully-intermeshing type co-rotating twin-screw kneading extruder used in a manufacturing method of a resin composition containing fine paper powder according to an embodiment of the present invention.

A manufacturing method of a resin composition containing fine paper powder according to an embodiment of the present invention will be described hereinafter.

The raw material used in the manufacturing method of a resin composition containing fine paper powder contains a fine paper powder which is obtained by pulverizing paper scraps, pulp sheet scraps and the like into a powder having an average particle diameter of 10 to 100 µm from 20 to 70 parts by weight, and a resin material comprising thermoplastic resin in pellet form, powder form and the like from 30 to 80 parts by weight. A sum of the fine paper powder and the thermoplastic resin is 100 parts by weight. The pulverization method for pulverizing the paper scraps, the pulp sheet scraps ant the like is not limited, for example, the pulverization may be performed by using a vertical roller mill, a herb mill or the like.

The average particle diameter is measured by using a laser diffraction-scattering type particle size distribution measuring instrument LMS-350 made by SEISHIN Enterprise Co. Ltd.

In the case that the average particle diameter of the fine paper powder is greater than 100 µm, it is highly possible that the fine paper powder aggregates in kneading, which in turn deteriorates the fluidity of molten resin and reduces the strength of the obtained resin composition containing fine paper powder. On the contrary, in the case that the average particle diameter of the fine paper powder is less than 10 µm, the fluidity and the strength will become better; however, it would be extremely difficult to manufacture the fine paper powder, which makes the manufacturing cost rise significantly.

In the case where the sum of the fine paper powder and the thermoplastic resin is 100 parts by weight, and when the fine paper powder is greater than 70 parts by weight or when the resin material is less than 30 parts by weight, the fine paper powder having no fluidity occupies the major part of the raw material, which in turn deteriorates the fluidity of the mixture and reduces the strength of the obtained resin composition containing fine paper powder. Moreover, since the major part of the obtained resin composition containing fine paper powder is of paper components, the strength thereof becomes low and fragile.

On the other hand, when the fine paper powder is less than 20 parts by weight or when the resin material is greater than 80 parts by weight, the heat-resistant softening properties of the obtained resin composition containing fine paper powder will be degraded. Moreover, in this case, functional expressions of the paper components are suppressed, such as the ability to absorb warping during the molding of the resin composition containing fine paper powder based on a flexible structure of the fine paper powder, and environmental performance will be degraded as well.

It is preferable that the fine paper powder is obtained by pulverizing waste papers into fine powder. Such waste papers typically are discarded in great amounts from offices, publishing houses, paper manufacturing companies and the like, and are valued as having a substantially zero negative effect on the environment. The waste papers include various types of waste papers, for example, old newspapers, old magazines, waste printed papers, used wrapping papers, discarded cardboard boxes, office paper, etc., broken and damaged sheets that occur upon manufacturing of virgin paper, cutting wastage from magazines and the like, grinding powders, shredder scraps, etc. It is acceptable that the fine paper powder is made by pulverizing pulp sheets into fine powder.

It is acceptable that the resin material is a thermoplastic resin; however, it is preferable that the resin material is polyolefin resin, polystyrene resin, or polylactic resin.

As an example of the polyolefin resin, polypropylene, polyethylene, or a mixture thereof may be given. As the polypropylene, polypropylene block polymer, polypropylene random polymer, polypropylene homopolymer, metallocene-catalyzed polypropylene polymer, catalloy process polypropylene, modified polypropylene or the like may be used. As the polyethylene, low-density polyethylene, linear low-density polyethylene, intermediate density polyethylene, high-density polyethylene, metallocene-catalyzed polyethylene, modified polyethylene, ethylene vinyl acetate (EVA) or the like may be used.

As an example of the polystyrene resin, such as PS resin (polystyrene resin), AS resin (acrylonitrile-styrene copolymer synthetic resin), ABS resin (acrylonitrile-butadiene-styrene copolymer synthetic resin) or the like may be given.

In order to modify the resin composition containing fine paper powder, it is acceptable to add the other types of resins, rubber, thermoplastic Elastomer and the like by 20 parts or less by weight into the raw material.

It is acceptable to add the additive from 0.3 to 5 parts by weight into the raw material where necessary. An antioxidant, a lubricant, a deodorant, a bleaching agent, a coloring agent, for example, may be added as the additive.

Particularly, a resin modifying agent is preferably contained therein. The resin modifying agent is a compound having a maleic anhydride group, such as maleic acid modified polyolefin, olefin-maleic anhydride copolymer, maleic acid modified wax, and maleate modified wax. Such resin modifying agents mix well with the resin material, in particular poly olefin resins, to introduce polar groups, thereby enhancing compatibility between the fine paper powder and the resin material and improving dispersibility.

A phenolic antioxidant, a phosphorous antioxidant and a sulfur antioxidant, for example, may be used as the antioxidant. Primary amide, secondary amide, ethylene-bis-amide, metal stearate, and metal hydroxystearate, for example, may be used as the lubricant.

An inorganic filling agent, such as titanium oxide, talc, calcium carbonate, calcium sulfate, barium sulfate, gypsum, clay and the like, may be added to the raw material where necessary.

In the manufacturing method of a resin composition containing fine paper powder according to an embodiment of the present invention, the kneading extruder is used to knead the raw material to yield the resin composition containing fine paper powder for molding.

Figure 2:
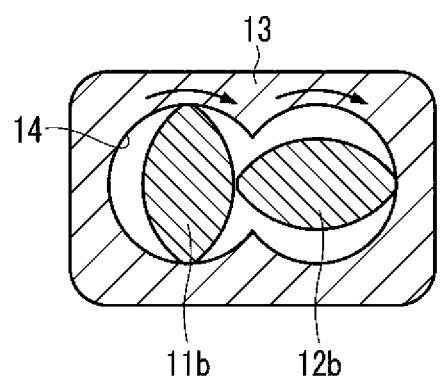
FIG. 2 is a cross sectional view cut along the II-II line of FIG. 1.

Hereinafter, with reference to FIG. 1 and FIG. 2, the kneading extruder 10 used in an embodiment of the present invention is described.

The kneading extruder 10 is a fully-intermeshing type co-rotating twin-screw kneading extruder. Two screws 11 and 12 are rotatably disposed in a tunnel 14 formed in a casing 13 in parallel. The cross section of the tunnel 14 has a shape of two joined circles. As illustrated in FIG. 2, the two screws 11 and 12 are configured to be rotated in the same direction by a driving device (not shown) disposed outside the casing 13.

An upstream end portion of the casing 13 is formed with a main material feeding port (upstream material feeding port) 15 in communication with the tunnel 14. The raw material except the fine paper powder is fed into the tunnel 14 via the main material feeding port 15 by a feeding device such as a top feeder or the like (not shown) disposed outside the casing 13.

Moreover, a mid portion of the casing 13 is formed with a sub material feeding port (downstream material feeding port) 16 in communication with the tunnel 14. The fine paper powder is fed into the tunnel 14 via the sub material feeding port 16 by a feeding device such as a side feeder or the like (not shown) disposed outside the casing 13.

While the raw material is transferred sequentially by the two screws 11 and 12 from the upstream side to a die 17 connected to the downstream end, the temperature of the raw material is increased gradually from the room temperature, and the molten resin material is mixed with the fine paper powder. Then, the resin composition containing fine paper powder in softening state is extruded to the outside from the exit of the die 17 in sheet shape.

The two screws 11 and 12 are of a fully-intermeshing type having no clearance therebetween. Each screw 11 or 12 is disposed with a screw unit 11a or 12a with a screw groove formed in the outer circumferential surface. A part of each screw 11 or 12 is formed into a kneading disc unit 11b or 12b. As illustrated in the drawing, each of the screws 11 and 12 is provided with a plurality of the screw units 11a or 12a and a plurality of the kneading disc unit 11b or 12b which are alternatively disposed in the longitudinal direction. In the present embodiment, each of the screws 11 and 12 is provided with 4 screw units 11a or 12a and 3 kneading disc units 11b or 12b.

The screw units 11a and 12a transfer the raw material fed from the 2 material feeding ports 15 and 16 through the tunnel 14 to the downstream side.

The kneading disc units 11b and 12b are of a fully-intermeshing type having only a very small clearance therebetween and between the casing 13. Thereby, it is possible to disperse the fine paper powder which is not meltable in the molten resin evenly without aggregation by kneading the raw material with the kneading disc units 11b and 12b.

Specifically, each of the kneading disc units 11b and 12b has an identical cross-sectional shape orthogonal to the central axis. The section has a minor diameter in a predefined direction and a major diameter orthogonal to the minor diameter. The kneading disc units 11b and 12b are disposed to intermesh with each other in such a way that the major axis of one kneading disc unit enters into a rotation area surrounding the major axis of the other kneading disc unit. The two screws 11 and 12 are configured to rotate at the same speed in the same direction with the major axes of the kneading disc units orthogonal to each other.

However, if the entire raw material including the fine paper powder is fed through the main material feeding port 15, the retention time of the fine paper powder at high temperature becomes longer; the paper components undergo thermal degradation, which causes a yellow discoloration or an unpleasant smell to occur in the obtained resin composition containing fine paper powder.

Therefore, in order to shorten the retention time of the fine paper powder in the kneading extruder 10 at high temperature, the raw material except the fine paper powder is fed through the main material feeding port 15, and the fine paper powder is fed through the sub material feeding port 16. Thereby, it is possible to inhibit the temperature of the fine paper powder from rising high, and is possible to knead the fine paper powder at a temperature of no more than 210° C. As a result thereof, it is possible to inhibit the thermal degradation of paper components, preventing the resin composition containing fine paper powder from having a yellow discoloration or having a burnt smell. Moreover, by feeding the fine paper powder at the room temperature through the sub material feeding port 16, it is possible to decrease the temperature of the molten resin which is transferred from the upstream at a high temperature.

Furthermore, if the entire raw material including the fine paper powder is fed through the main material feeding port 15, since the volume density becomes smaller, the feeding speed is limited. However, in the present invention, the fine paper powder is fed through the sub material feeding port 16. Thereby, it is possible to increase the feeding amount of the raw material per unit time, which increases the entire feeding speed and improves the production efficiency as well.

The fine paper powder has a very small volume density, contains a large amount of air and water moisture, so that when it is heated, it releases a large amount of water vapor. The other materials such as the resin material and the like also contain therein air and water moisture. In order to degas the gases such as air, water moisture and the like therefrom, an open vent 18 is disposed in the casing 13 in communication with the tunnel 14. The gases such as air, water moisture and the like generated in kneading are released out to the atmosphere from the open vent 18.

A downstream portion of the casing 13 is disposed with a vacuum degassing vent 19 in communication with the tunnel 14. The vacuum degassing vent 19 is connected by a vacuum pump (not shown). The gases such as air, water moisture and the like generated in kneading or the like are forcibly pumped out via the vacuum degassing vent 19.

The gases such as air, water moisture and the like can be satisfactorily degassed via the vents 18 and 19, it is possible to prevent water moisture from being absorbed by the fine paper powder of a very high hygroscopicity and the gases such as air, water moisture and the like from being contained in the obtained resin composition containing fine paper powder. Thereby, it is possible to improve the quality of the obtained resin composition containing fine paper powder and the discharge rate thereof as well.

The downstream end of the tunnel 14 is configured to communicate with a discharge opening 20 formed in the casing 13. The downstream side of the discharge opening 20 is connected with the die 17 having a slit-shaped exit. The resin composition containing fine paper powder is extruded out from the die 17 into a sheet shape.

The resin composition containing fine paper powder extruded from the kneading extruder 10 in a sheet shape is received by a cooling receiver (not shown) provided with a plurality of rollers, cooled and solidified while being drawn by the rollers, and wound up by a sheet winder.

The resin composition sheet containing fine paper powder obtained as mentioned above is superior in tensile strength, extensibility and the like, thereby, is a good molding material. In addition, the sheet is made of resin containing fine paper powder having an average particle diameter of 10 to 100 μm, which is superior in transferability; if it is molded, it is possible to obtain a molded article of high quality.

In addition to the sheet shape, the resin composition containing fine paper powder may be formed into a pellet shape as well. In this case, the die 17 having a round pore is connected to the downstream side of the discharge opening 20. The resin composition containing fine paper powder in softening state is extruded out from the die 17 in a cylindrical shape, solidified in a tank of water, cut by a cutting machine to form into the pellet shape. It is acceptable to use a hot-cut type pellet manufacturing machine as well. It is also acceptable to use the manufactured pellets to form the resin composition containing fine paper powder into the sheet shape or the like.

It is possible to mold the resin composition containing fine paper powder which has been formed into the sheet shape, the pellet shape or the like into a desired molded article according to molding processes such as injection molding, blow molding, inflation molding, vacuum molding, compression molding, molten compression molding, press molding and the like.

The present invention is not limited to the above embodiment, it should be understood that other possible modifications and variations made without departing from the spirit and scope of the present invention will be comprised in the present invention.

EXAMPLES

Hereinafter, detailed examples of the present invention will be specifically given to describe the present invention.

Examples 1-7 and Comparative Example 1

In Examples 1-7 and Comparative example 1, a raw material was prepared to contain fine paper powder of an average particle diameter of 10 μm, 30 μm, 50 μm and 100 μm at parts by weight listed in Table 1, polypropylene (MA-03 made by Japan Polypropylene Corporation) at parts by weight listed in Table 1, polyethylene (UF-421 made by Japan Polyethylene Corporation) at 10 parts by weight, an anti-oxidizing agent (ADK STAB AO-60 made by ADEKA Corporation) at 1 part by weight, and calcium stearate at 1 part by weight. The average particle diameter of the fine paper powder was measured by using a laser diffraction-scattering type particle size distribution measuring instrument LMS-350 made by SEISHIN Enterprise Co. Ltd.

The raw material was extruded into the sheet shape by using the kneading extruder 10 mentioned above with the fine paper powder being fed through the sub material feeding port 16 and the entire raw material except the fine paper powder being fed through the main material feeding port 15. Melt flow rates (MFR) for the obtained resin compositions containing fine paper powder were measured according to a specified measuring method in JIS K7210. Izod impact values for the obtained resin compositions containing fine paper powder were measured were measured according to Izod impact test. The measured values were recorded in respective columns of Table 1.

It is obviously shown in Table 1 that, in Examples 1-7, when a raw material containing a fine paper powder of an average particle diameter of 10 to 100 μm from 20 to 70 parts by weight, and polypropylene and polyethylene in total from 30 to 80 parts by weight was used, the obtained resin composition containing fine paper powder has a good fluidity with a melt flow rate of 0.9 to 13 gr/10 min and a good strength with an Izod impact value of 1.7 to 10 KJ/m², which is no fragile.

On the other hand, in Comparative example 1, when a raw material containing 80 parts by weight of fine paper powder of an average particle diameter of 50 μm, and 20 parts by weight of polypropylene and polyethylene in total was used, the obtained resin composition containing fine paper powder has a low fluidity with a melt flow rate of 0.1 gr/10 min and is fragile with an Izod impact value of 0.5 KJ/m².

TABLE 1

|  | Example 1 | Example 2 | Example 3 | Example 4 | Example 5 | Example 6 | Example 7 | Comparative Example 1 |
|---|---|---|---|---|---|---|---|---|
| fine paper powder feeding port | sub material feeding port 16 | | | | | | | |
| fine paper powder | | | | | | | | |
| average particle diameter (μm) | 10 | 30 | 50 | 100 | 50 | 50 | 50 | 50 |
| (part by weight) | 50 | 50 | 50 | 50 | 20 | 30 | 70 | 80 |
| polypropylene (part by weight) | 40 | 40 | 40 | 40 | 70 | 60 | 20 | 10 |
| polyethylene (part by weight) | 10 | 10 | 10 | 10 | 10 | 10 | 10 | 10 |
| anti-oxidizing agent (part by weight) | 1 | 1 | 1 | 1 | 1 | 1 | 1 | 1 |
| lubricant (part by weight) | 1 | 1 | 1 | 1 | 1 | 1 | 1 | 1 |
| melt flow rate (gr/10 min) | 13 | 7.1 | 3.0 | 0.9 | 12 | 8.0 | 1.4 | 0.1 |
| Izod impact value (KJ/m²) | 10 | 5.1 | 3.2 | 1.7 | 8.0 | 2.5 | 2.0 | 0.5 |

Examples 8, 9 and Comparative Example 2, 3

In Example 8 and Comparative example 2, a raw material was prepared to contain 30 parts by weight of the fine paper powder having an average particle diameter of 50 μm, 60 parts by weight of polypropylene (MA-03 made by Japan Polypropylene Corporation), 10 parts by weight of polyethylene (UF-421 made by Japan Polyethylene Corporation), 1 part by weight of an anti-oxidizing agent (ADK STAB AO-60 made by ADEKA Corporation), and 1 part by weight of calcium stearate.

In Example 9 and Comparative example 3, a raw material was prepared to contain 30 parts by weight of the fine paper powder having an average particle diameter of 50 μm, 70 parts by weight of high-impact polystyrene, 1 part by weight of an anti-oxidizing agent (ADK STAB AO-60 made by ADEKA Corporation), and 1 part by weight of calcium stearate.

Thus, the raw material in Example 8 is the same as the raw material in Comparative example 2, and the raw material in Example 9 is the same as the raw material in Comparative example 3. The average particle diameter of the fine paper powder was measured by using the laser diffraction-scattering type particle size distribution measuring instrument LMS-350 made by SEISHIN Enterprise Co. Ltd.

In Examples 8 and 9, the raw material was extruded into the sheet shape by using the kneading extruder 10 mentioned above with the fine paper powder being fed through the sub material feeding port 16 and the entire raw material except the fine paper powder being fed through the main material feeding port 15. On the other hand, in Comparative examples 2 and 3, the entire raw material was fed through the main material feeding port 15 and was extruded into the sheet shape by using the above kneading extruder 10. The diameter of either the kneading disc unit 11b or the kneading disc unit 12b in the kneading extruder 10 is 50 mm.

The discharge rate and the highest temperature of the resin composition containing fine paper powder discharged from the kneading extruders were measured. The measured values were recorded in respective columns of Table 2. In addition, whether a yellow discoloration and a burnt smell are present or not in the obtained resin composition sheets containing fine paper powder was observed. The observation results were recorded in respective columns of Table 2.

It is obviously shown in Table 2 that, in Examples 8 and 9 where the fine paper powder was fed through the sub material feeding port 16 into the kneading extruder 10, the discharge rates were as high as 105 kg/hr and 83 kg/hr, respectively, denoting good production efficiency.

However, in Comparative examples 2 and 3 where the fine paper powder was also fed through the main material feeding port 15 into the kneading extruder 10, the discharge rates were as low as 58 kg/hr and 38 kg/hr, respectively, denoting worse production efficiency.

Moreover, in Examples 8 and 9 where the fine paper powder was fed through the sub material feeding port 16 into the kneading extruder 10, the highest temperatures were 200° C. and 210° C., respectively, equal to or lower than 210° C., and there was no yellow discoloration occurred in the obtained resin composition containing fine paper powder.

On the other hand, in Comparative examples 2 and 3 where the fine paper powder was also fed through the main material feeding port 15 into the kneading extruder 10, the highest temperatures were 220° C. and 240° C., respectively, greater than 210° C., and the yellow discoloration and a burnt smell occurred in the obtained resin composition containing fine paper powder.

TABLE 2

| | | Example 8 | Example 9 | Comparative Example 2 | Comparative Example 3 |
|---|---|---|---|---|---|
| fine paper powder feeding port | | sub material feeding port 16 | sub material feeding port 16 | main material feeding port 15 | main material feeding port 15 |
| fine paper powder | average particle diameter (μm) | 50 | 50 | 50 | 50 |
| | (part by weight) | 30 | 30 | 30 | 30 |
| polypropylene (part by weight) | | 60 | 0 | 60 | 0 |
| polyethylene (part by weight) | | 10 | 0 | 10 | 0 |
| high-impact polystyrene (part by weight) | | 0 | 70 | 0 | 70 |
| anti-oxidizing agent (part by weight) | | 1 | 1 | 1 | 1 |
| lubricant (part by weight) | | 1 | 1 | 1 | 1 |
| discharge rate (kg/hr) | | 105 | 83 | 58 | 38 |
| highest temperature (° C.) | | 200 | 210 | 220 | 240 |
| yellow discoloration | | negative | negative | positive | severe |
| burnt smell | | negative | negative | positive | severe |

What is claimed is:

1. A manufacturing method for manufacturing a resin composition containing fine paper powder used in molding by using a fully-intermeshing type co-rotating twin-screw kneading extruder having a plurality of material feeding ports to knead a raw material containing a fine paper powder having an average particle diameter of 10 to 100 μm from 20 to 70 parts by weight, a thermoplastic resin from 30 to 80 parts by weight, with a sum of the fine paper powder and the thermoplastic resin being 100 parts by weight, at a temperature of no more than 210° C., by feeding the thermoplastic resin through an upstream material feeding port and the fine paper powder through a downstream material feeding port, wherein:
the fully-intermeshing type co-rotating twin-screw kneading extruder is provided with two screws;
at least a part of each screw is provided with a kneading disc unit;
the kneading disc unit disposed in one screw has a cross section which is orthogonal to the central axis of the screw, has a minor axis and a major axis orthogonal to each other, and has the same cross section as the kneading disc unit disposed in the other screw;
the two screws are disposed in such a way that the major axis of the kneading disc unit disposed in one screw enters into a rotation area surrounding the major axis of the kneading disc unit disposed in the other screw;
the two screws are configured to rotate at the same speed in the same direction with the major axis of the kneading disc unit disposed in one screw orthogonal to the major axis of the kneading disc unit disposed in the other screw; and
said upstream material feeding port is located proximate an upstream end of said screws and said downstream material feeding port is located at a midsection of said fully-intermeshing type co-rotating twin-screw extruder, such that said downstream material feeding port is distanced from said upstream end by at least half a total length of said screws.

2. The manufacturing method for manufacturing the resin composition containing fine paper powder according to claim 1, wherein the thermoplastic resin is polyolefin resin, polystyrene resin, or polylactic resin.

3. The manufacturing method for manufacturing the resin composition containing fine paper powder according to claim 2, wherein the polyolefin resin is polyethylene, polypropylene, or a mixture thereof.

4. The manufacturing method for manufacturing the resin composition containing fine paper powder according to claim 1, wherein the raw material contains a compound having a maleic anhydride group from 0.3 to 5 parts by weight.

5. The manufacturing method for manufacturing the resin composition containing fine paper powder according to claim 1, wherein each of the screws is provided with a plurality of screw units and a plurality of kneading disc units, which are alternately disposed along a longitudinal direction of the screws.

6. The manufacturing method for manufacturing the resin composition containing fine paper powder according to claim 5, wherein on each of the screws, a number of the screw units is greater than a number of the kneading disk units.

7. The manufacturing method for manufacturing the resin composition containing fine paper powder according to claim 6, wherein each of the screws is provided with four screw units and three kneading disc units.

8. A manufacturing method for manufacturing a resin composition containing fine paper powder used in molding by using a fully-intermeshing type co-rotating twin-screw kneading extruder having a plurality of material feeding ports to knead a raw material containing a fine paper powder having an average particle diameter of 10 to 100 µm from 20 to 70 parts by weight, a thermoplastic resin from 30 to 80 parts by weight, with a sum of the fine paper powder and the thermoplastic resin being 100 parts by weight, at a temperature of no more than 210° C., by feeding the thermoplastic resin through an upstream material feeding port and the fine paper powder through a downstream material feeding port,
wherein:
the fully-intermeshing type co-rotating twin-screw kneading extruder is provided with two screws;
at least a part of each screw is provided with a kneading disc unit;
the kneading disc unit disposed in one screw has a cross section which is orthogonal to the central axis of the screw, has a minor axis and a major axis orthogonal to each other, and has the same cross section as the kneading disc unit disposed in the other screw;
the two screws are disposed in such a way that the major axis of the kneading disc unit disposed in one screw enters into a rotation area surrounding the major axis of the kneading disc unit disposed in the other screw;
the two screws are configured to rotate at the same speed in the same direction with the major axis of the kneading disc unit disposed in one screw orthogonal to the major axis of the kneading disc unit disposed in the other screw; and
each of the screws is provided with a plurality of screw units and a plurality of kneading disc units, which are alternately disposed along a longitudinal direction of the screws, and each of the screws is provided with four screw units and three kneading disc units.

9. The manufacturing method for manufacturing the resin composition containing fine paper powder according to claim 8, wherein the thermoplastic resin is polyolefin resin, polystyrene resin, or polylactic resin.

10. The manufacturing method for manufacturing the resin composition containing fine paper powder according to claim 9, wherein the polyolefin resin is polyethylene, polypropylene, or a mixture thereof.

11. The manufacturing method for manufacturing the resin composition containing fine paper powder according to claim 8, wherein the raw material contains a compound having a maleic anhydride group from 0.3 to 5 parts by weight.

12. A manufacturing method for manufacturing a resin composition containing fine paper powder used in molding by using a fully-intermeshing type co-rotating twin-screw kneading extruder having a plurality of material feeding ports to knead a raw material containing a fine paper powder having an average particle diameter of 10 to 100 µm from 20 to 70 parts by weight, a thermoplastic resin from 30 to 80 parts by weight, with a sum of the fine paper powder and the thermoplastic resin being 100 parts by weight, at a temperature of no more than 210° C., by feeding the thermoplastic resin through an upstream material feeding port and the fine paper powder through a downstream material feeding port,
wherein:
the fully-intermeshing type co-rotating twin-screw kneading extruder is provided with two screws;
at least a part of each screw is provided with a kneading disc unit;
the kneading disc unit disposed in one screw has a cross section which is orthogonal to the central axis of the screw, has a minor axis and a major axis orthogonal to each other, and has the same cross section as the kneading disc unit disposed in the other screw;
the two screws are disposed in such a way that the major axis of the kneading disc unit disposed in one screw enters into a rotation area surrounding the major axis of the kneading disc unit disposed in the other screw;
the two screws are configured to rotate at the same speed in the same direction with the major axis of the kneading disc unit disposed in one screw orthogonal to the major axis of the kneading disc unit disposed in the other screw; and
an open vent is disposed in said fully-intermeshing type co-rotating twin-screw kneading extruder, and said downstream material feeding port is disposed proximate said open vent on an upstream side of said open vent; and
each of the screws is provided with a plurality of screw units and a plurality of kneading disc units, which are alternately disposed along a longitudinal direction of the screws, and each of the screws is provided with four screw units and three kneading disc units.

13. The manufacturing method for manufacturing the resin composition containing fine paper powder according to claim 12, wherein the thermoplastic resin is polyolefin resin, polystyrene resin, or polylactic resin.

14. The manufacturing method for manufacturing the resin composition containing fine paper powder according to claim 13, wherein the polyolefin resin is polyethylene, polypropylene, or a mixture thereof.

15. The manufacturing method for manufacturing the resin composition containing fine paper powder according to claim 12, wherein the raw material contains a compound having a maleic anhydride group from 0.3 to 5 parts by weight.

* * * * *